United States Patent [19]

Dorwin

[11] 4,164,297
[45] Aug. 14, 1979

[54] FOLDING GOOSENECK FOR TRAILER

[75] Inventor: John J. Dorwin, Hiawatha, Iowa

[73] Assignee: Barnard & Leas Mfg. Co., Cedar Rapids, Iowa

[21] Appl. No.: 814,163

[22] Filed: Jul. 11, 1977

[51] Int. Cl.² .............................................. B60P 1/14
[52] U.S. Cl. ................................. 414/481; 280/423 B
[58] Field of Search .................... 280/423 B, 425 A; 214/505, 506, 85

[56] References Cited

U.S. PATENT DOCUMENTS 2,774,497  12/1957  Martin ............................ 280/423 B
3,894,645  7/1975  Verschage ....................... 280/425 A Primary Examiner—John A. Pekar
Attorney, Agent, or Firm—McDougall, Hersh & Scott

[57] ABSTRACT

A trailer in which the gooseneck is interconnected to the front end of the platform by a pair of links pivotally interconnecting the gooseneck and trailer frame for controlled movement of the gooseneck between raised position, normal transport position and ground engaging position, and whereby the forward end of the trailer is also controlled in movement between raised position, normal transport position and ground engaging position.

9 Claims, 5 Drawing Figures

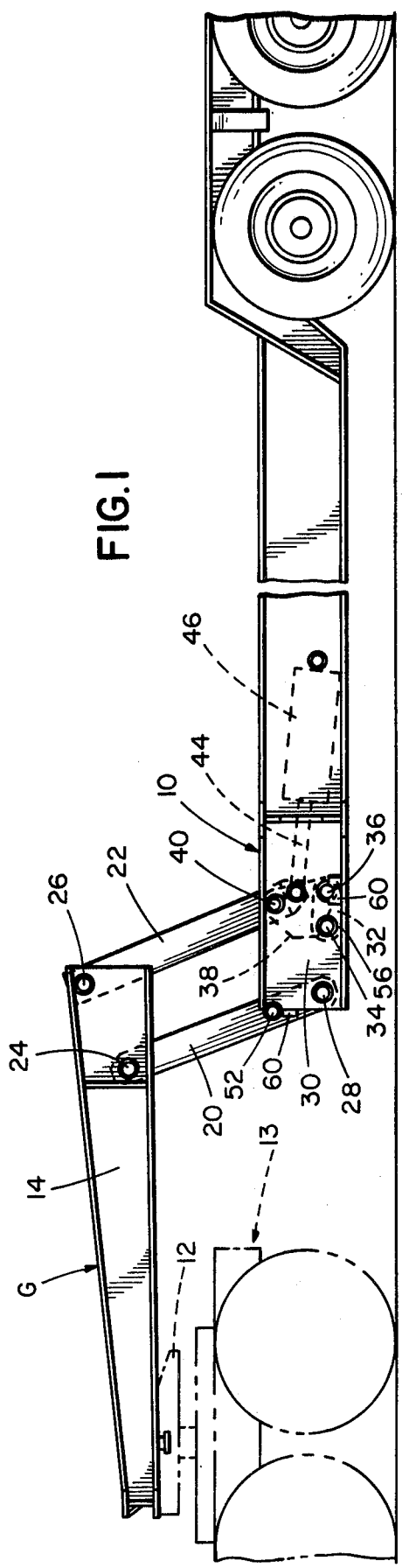
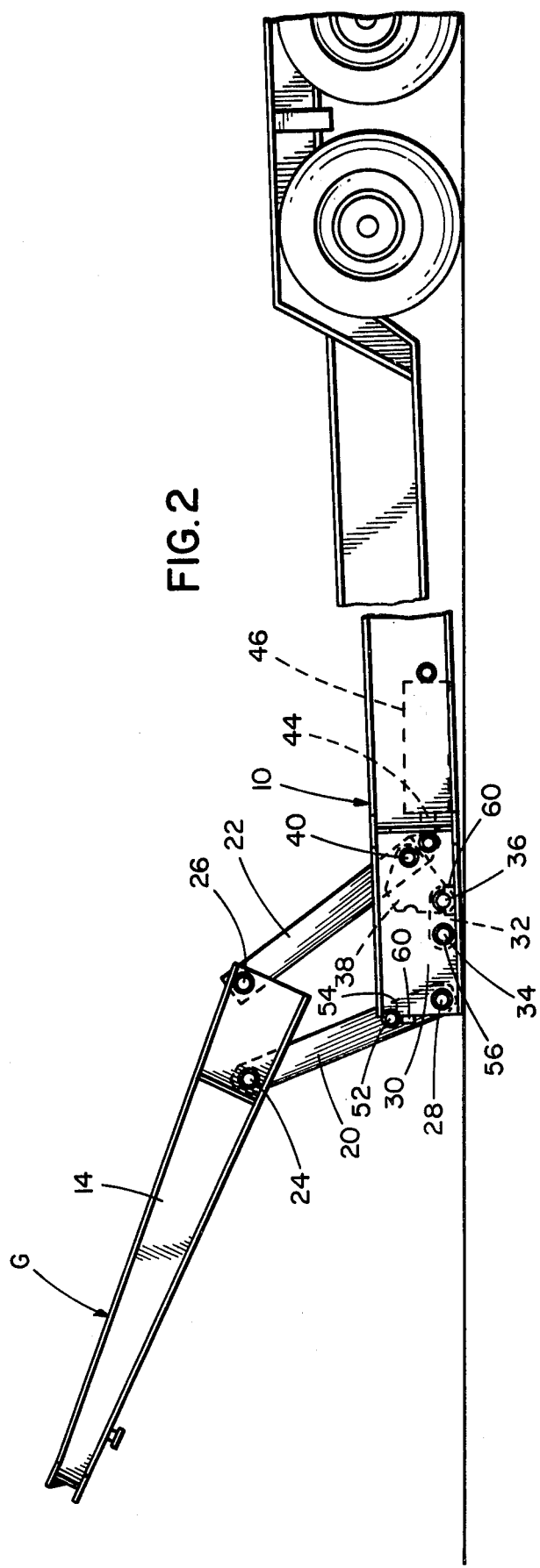

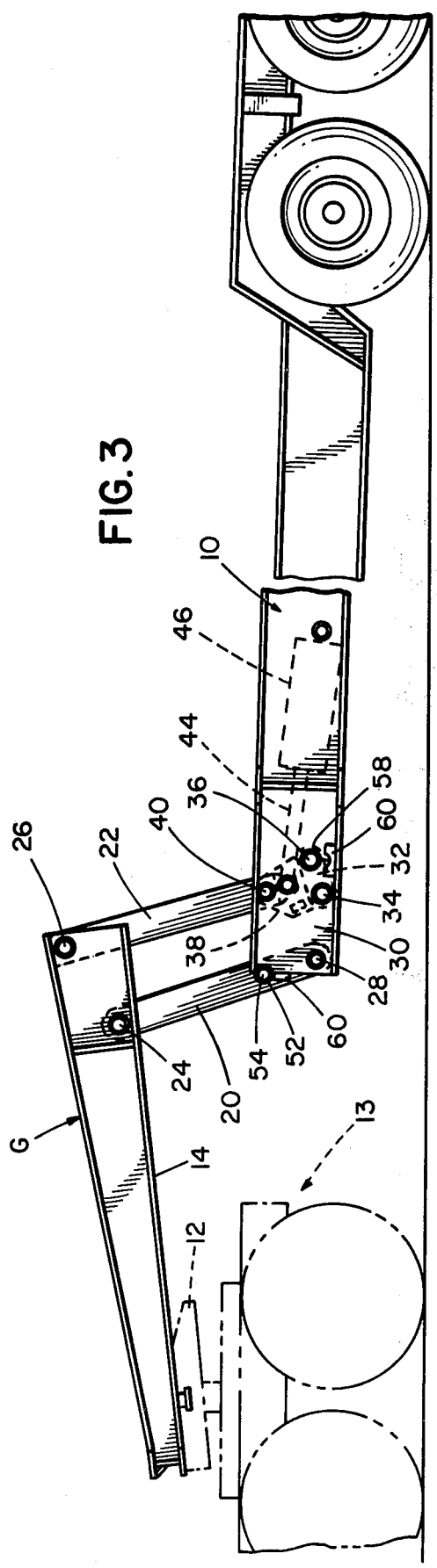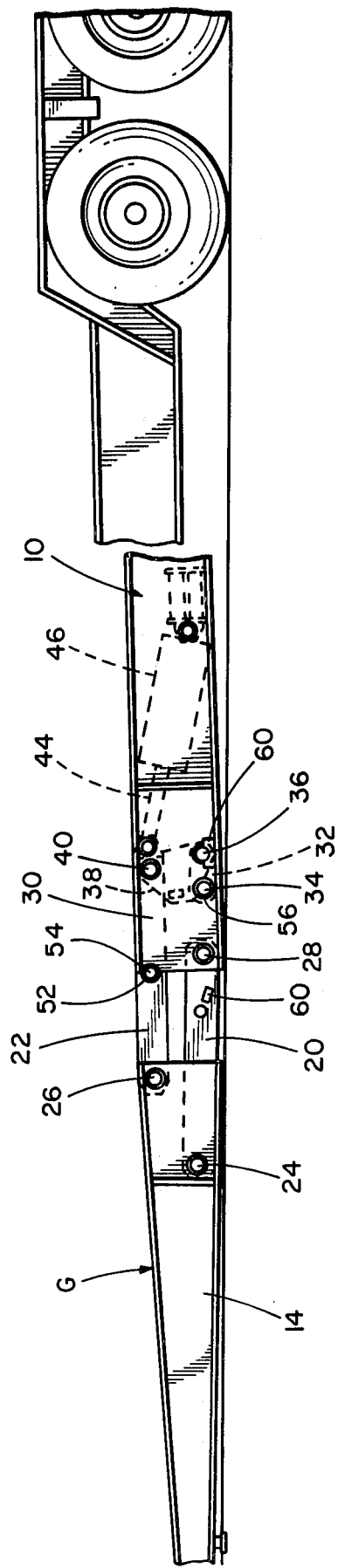

FOLDING GOOSENECK FOR TRAILER

This invention relates to trailers having relatively low carrying beds normally supported on the rearward end portion on wheels while the forward end is provided with a gooseneck for connection onto the fifth wheel of a power operated vehicle appropriate for draft means, such as a tractor or truck.

Trailers of the type described are designed chiefly for the transportation of heavy equipment or slow moving vehicles used in excavation or heavy construction. For purposes of loading and unloading such equipment onto and off of the bed of the trailer, it is desirable to make use of a concentric which can be lowered to ground level for use as a ramp, thereby to eliminate the need for carrying a separate ramp and to provide means for positioning said separate ramp in endwise alignment with the bed to enable movement of the equipment or vehicles off and onto the bed or platform.

Since the bed of a trailer of the type described is low slung, sometimes only a matter of inches above the ground, it is desirable to incorporate means for raising and lowering the bed of the trailer relative to the ground so as to be able to clear obstructions which may be encountered by the trailer.

Thus, it is an object of this invention to provide a trailer having new and improved mechanism for operation of the gooseneck whereby the bed of the trailer can be adjusted to vary the distance from the ground and wherein the gooseneck can be raised for release from the fifth wheel and/or lowered to the ground for use as a ramp aligned with the end of the trailer bed for movement of vehicles and equipment thereover, onto and off of the trailer bed.

These and other objects and advantages of this invention will hereinafter appear and for purposes of illustration, but not of limitation, an embodiment of the invention is shown in the accompanying drawings, in which:

FIG. 1 is an elevational view of the gooseneck end portion of the trailer, showing the elements in their normal transport position;

FIG. 2 is an elevational view of the elements shown in FIG. 1, showing the gooseneck in raised position with the end of the trailer bed lowered to the ground;

FIG. 3 is a side elevation view similar to those of FIGS. 1 and 2 but showing the gooseneck end portion of the trailer bed or platform raised to above normal position;

FIG. 4 is a side elevational view similar to those of FIGS. 1 to 3 showing the gooseneck and trailer platform or bed lowered to the ground for use as a ramp.

Figure 5:
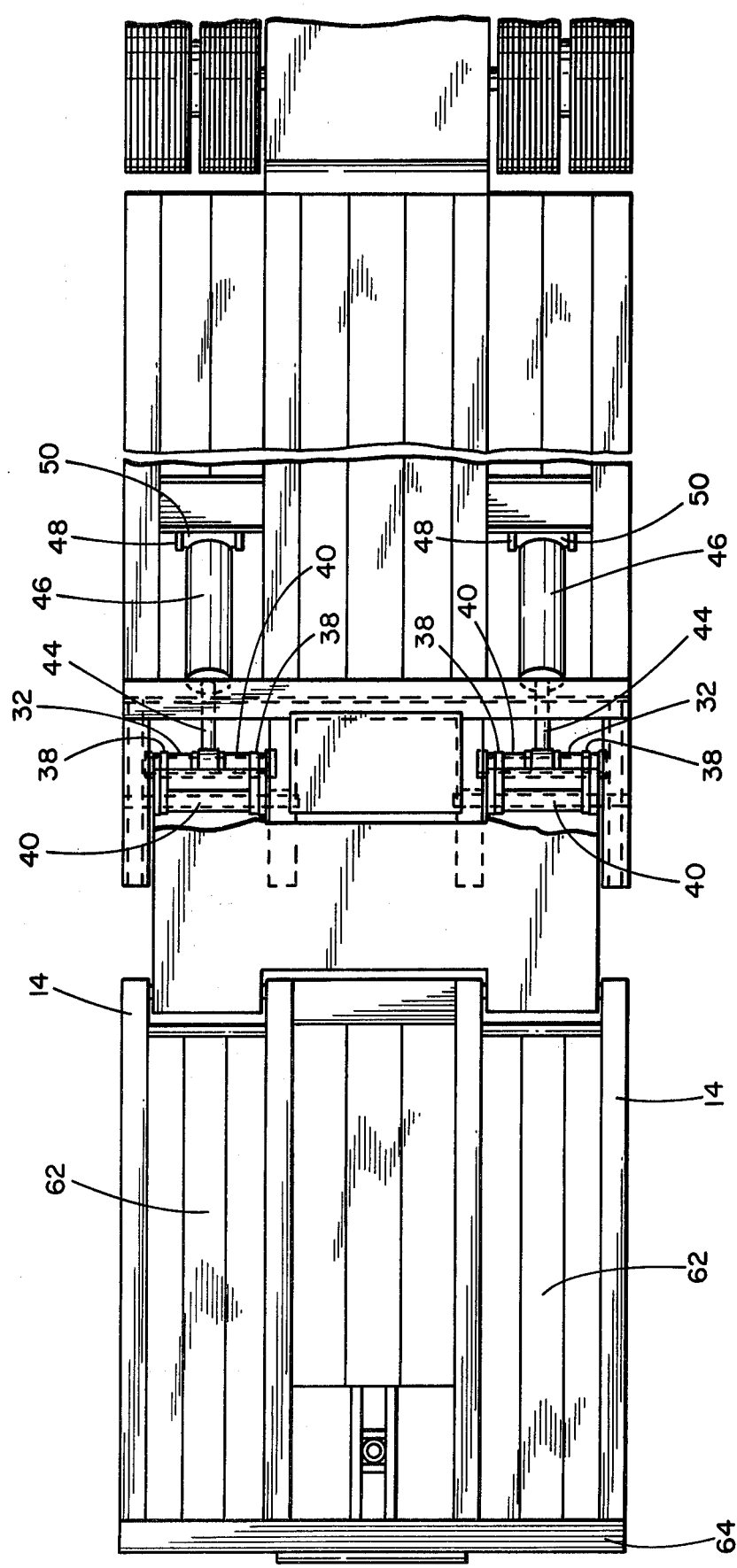
FIG. 5 is a fragmentary top plan view of the arrangement of elements shown in FIG. 4.

Referring now to the drawings, 10 represents the bed, hereinafter referred to as the platform of a trailer, supported at its rearward end portion on wheels and having a concentric extension G at its forward end by which it is connected in a conventional manner to and supported by the fifth wheel mechanism 12 of a tractor or truck 13.

Ordinarily, the elongate horizontally disposed beams of the concentric are provided as integral extensions from the front end of the frame of the platform, being joined thereto by offsets to provide the necessary clearance beneath the gooseneck to receive the tractor and for engagement with the fifth wheel.

In accordance with the practice of this invention, each of the laterally spaced apart beams 14 of the gooseneck are joined to the forward end of the platform frame of the trailer by a pair of links 20 and 22, in which the forward link 20 is referred to as a tension link, while the rearward link 22 is referred to as the compression link. It will be understood that the beam 14 and links 20 and 22 are duplicated on the other side of the platform frame such that description with respect to the mechanism of the one will apply to the other.

The links 20 and 22 are pivotally secured at their outer end portions to longitudinally spaced apart portions of the gooseneck beam 14 with the pin 24 on which the tension link is pivoted being below and forwardly of the pin 26 for the compression link.

Means are provided pivotally to interconnect the rearward end portion of the tension link 20 and the compression link 22 to the platform frame. For this purpose, a pair of laterally spaced apart horns 21 are connected by a crosswise extending sill 23 to extend forwardly from the forward end portion of the bed 10. The rearward end portion of the tension link 20 is pivotally mounted on pin 28 extending from a lower forward end portion of the horn 21 to provide a fixed pivot about which the tension link 20 can rock in a vertical plane. For pivotal attachment of the rearward end portion of the compression link 22, there is provided a rocker arm assembly 32 mounted at one end on a pin 34 extending from the side of the horn 21 for rocking movement of the assembly 32 in a vertical plane about the pin. The free end of the rocker arm assembly 32 is pivoted at 36 onto one end portion of a crank arm 38. A horizontally disposed axle 40 passes through the crank arms 38 on the opposite sides of the horn and connects them with the compression link 22 adjacent the end thereof for joint movement of the crank arms about their pivot 34.

A bracket 41 extending rearwardly from a mid-portion of the axle 40 is connected by means of a pin 42 to the forward end of an elongate rod 44 extending forwardly from a piston operating within a fluid cylinder 46. Pins 50 extend laterally from the base of the cylinder into engagement with a bracket 48 fixed to the trailer frame for rocking movement of the fluid cylinder in a vertical plane about pivot pins 50. The pivotal connection between the compression link 22 and the frame 10 is rearwardly and at a higher level than the pivot 28 for the rearward end portion of the tension link whereby the pivots between the links 20 and 22 more or less define a parallelogram.

One or both of the tension links 20 is provided with a means for locking the tension link in normal position and for releasing the tension link for rocking movement to enable the concentric beam 14 to be lowered to ramp position. In the illustrated modification such locking means comprises an opening 52 through the lower portion of the link 20 spaced a short distance forwardly from the pivot 28 and an opening in the upper forward portion of the horn 21 with the openings in registry, in normal position, to enable insertion of a locking pin 54 for fixing the position of the tension link.

Means are provided for support of the crank arm 38 in its extended and retracted positions. For this purpose, a curvilinear indentation 56 is provided in the forward edge portion of the crank arm 38 spaced from the pivot 36 by an amount corresponding to the spaced relation between the pivots 36 and 34 so that the curvilinear portion will rest on the pivot pin 34 when the rocker arm is displaced to its extended position. In its retracted position, the shaft 36 is adapted to seat at each end in sockets 58 formed in the upper surface of a bracket 60 fixed to a portion of the horn 21 spaced rearwardly from the pivot pin 34 by an amount corresponding to the distance between pivot pins 34 and 36.

The arrangement of elements in transport position is shown in FIG. 1 with the gooseneck resting on the truck fifth wheel and with the tension link locked in position, i.e. the locking pin 54 extending through the aligned opening 52 in the platform frame and tension link to lock the link against movement. The crank arm 38 is in its normal position with the shaft 36 resting in the socket 58 and the curvilinear portion 56 resting on the pin 34.

When it is desired to disengage the gooseneck and lower the platform to ground position, the hydraulic cylinder 46 is operated to introduce fluid under pressure into the head end of the cylinder to cause the piston and piston rod 44 to retract. This causes the crank arm 38 to rock rearward about its pivot 36 whereby the compression link 22 is displaced rearwardly and downwardly to the position shown in FIG. 2 while the rocker arm 32 remains in retracted position. Such displacement of the rearward end portion of the compression link 22, while the tension link 20 remains locked in fixed position, causes the platform to be lowered until the forward end portion comes to rest on the ground, as illustrated in FIG. 2.

An abutment 39 extends inwardly from a portion between the pivot of the crank arm 38 in position to come into engagement with the forward edge of the compression link 22 during rocking movement of the crank arm 38, as shown in FIG. 2.

Continued displacement of the rearward end portion of the link 22 in the rearward and downward direction, responsive to continued withdrawal of the piston rod 44 brings the abutment into engagement with the side plates of the compression link. This causes the gooseneck to rock in the clockwise direction about the pivot 24 at the upper end of the tension link, whereby the gooseneck is raised to the position shown in FIG. 2. At this time, the fifth wheel can be disengaged to enable the truck to be driven from under the gooseneck.

Thereafter, to lower the gooseneck to the ground for operation as a ramp leading onto the lowered platform, the locking pin 54 is disengaged and pressure fluid is introduced into the base of the hydraulic cylinder 46 to extend the piston 44 whereby the crank arm 38 is rocked forwardly about its pivot 36 while still at rest in its socket 58. This causes the crank arm 38 to rotate about its pivot 36 to extended position with concurrent movement of the compression link 22 in the upward and forward direction with concurrent rocking movement in the counterclockwise direction about its pivot 40. Thus the pivoted end portion of the compression link 22 is displaced upwardly and forwardly through an arc. Such movement is translated through the pivotal connection with the beam 14 to the tension link which is caused to rock about its fixed pivotal connection 28 whereby the links are rocked to lowered position with the compression link extending forwardly substantially horizontally from its pivot 40 in spaced substantially parallel relation above the tension link 20, as the beam 14 is let down by the link to rest on the ground in endwise alignment with the platform, as shown in FIG. 4.

To return the elements to transport position, the sequence is reversed in that the piston rod 44 is withdrawn whereby the crank arm 38 is first rocked in the clockwise direction about its pivot 36 and then in the counterclockwise direction in response to continued rearward displacement of the end of the compression link 22. This causes the beams 14 to be raised to a position to enable the truck to be operated to bring the fifth wheel into position to be engaged by the concentric.

When it is desired to raise the platform above normal position to clear an obstruction or the like, the tension link is retained in locked position and the platform is caused to rise to a higher level responsive to operation of the hydraulic cylinder to cause forward displacement of the piston rod 44. In response thereto, the crank arm 38 is displaced for rotation about pivot 34 to raise the shaft 36 from seated relation within the socket 58. The platform can be lowered to below normal position in the same manner as the platform is lowered to ground position, i.e. by withdrawing the piston rod but to a lesser degree, while the tension link 20 remains locked.

Means are provided on the tension link 20 for arresting movement when displaced to normal transport position. Such means on the tension link is illustrated by an abutment 61 which comes into engagement with the forward edge of the horn 21 when the tension link 20 is rocked to normal transport position. The opening 52 becomes aligned to enable interlock by insertion of the locking pin 54 through the aligned opening.

When the gooseneck beams are lowered to ground position, planks 62 can be laid between the beams, with the ends of the planks resting on the forward and rearward cross pieces 64 to provide a ramp over which the load can travel for transfer of such load onto the platform.

It will be understood that changes may be made in the details of construction, arrangement and operation without departing from the spirit of the invention, especially as defined in the following claims.

I claim:

1. In a trailer structure of the character described which includes a gooseneck extension joined to a forward end of the trailer and adapted releasably to be connected to a tow unit, means for mounting the gooseneck for movement between normal position for connection with the fifth wheel of said tow unit, raised position and lowered position, and for movement of the forward end of the trailer between raised position, normal position for transport, and lowered position, said means comprising forward and rearward links pivoted at their upper end portions to rearward end portions of the gooseneck with the pivot for the rearward link above and rearwardly of the pivot for the forward link, means pivotally securing a lower end portion of the forward link to the trailer frame for rocking movement about a horizontal axis, means pivotally connecting a lower end portion of the rearward link to the trailer frame rearwardly and above the pivot for the forward link comprising crank arm means pivotally connected at one end to the lower end portion of the rearward link, rocker arm means pivotally connected at one end to the trailer frame for rocking movement about a horizontal axis, and a pivotal connection between a portion of the rocker arm means offset from its pivot and a portion of the crank arm means offset from its pivot to the link, and actuating means operatively engaging a rearward end portion of the rearward link for displacement in a vertical plane.

2. A trailer as claimed in claim 1 in which the actuating means comprises a hydraulic cylinder having a piston rod pivotally connected to the rearward end portion of the rearward link.

3. A trailer as claimed in claim 1 in which said crank arm means including a pair of crank arms is provided adjacent each of the laterally spaced side frames of the trailer and which includes a shaft extending crosswise for pivotal interconnection with the crank arms at the pivot to the lower portion of the rearward link.

4. A trailer as claimed in claim 1 which includes a stop on the lower portion of the forward link in position to engage the forward end of the trailer frame when the gooseneck is in normal position.

5. A trailer as claimed in claim 1 which includes means for releasably locking the forward link when the gooseneck is in normal position.

6. A trailer as claimed in claim 5 in which the means for releasably locking the forward link comprises a pin, an opening in the trailer frame and link which are in registry when the link is in raised or normal transport position to enable the insertion of the locking pin therethrough.

7. A trailer as claimed in claim 1 which includes a socket fixed to the frame in position to be engaged by the crank arm means when the gooseneck is in normal position.

8. A trailer as claimed in claim 1 in which said rocker arm means includes rocker arms which are pivoted to laterally spaced apart frame members of the trailer and in which the pivotal interconnection between the crank arms means and rocker arms comprises a shaft extending crosswise between the rocker arms for interconnecting the rocker arms and the crank arms means.

9. A trailer as claimed in claim 1 which includes an abutment extending laterally from a portion of the crank arm means offset from its pivots and into the path of a forward edge of the rearward link offset from its pivot to lift the link about its rearward pivot responsive to rearward displacement of the crank arm means about its link pivot to raise the gooseneck and lower the gooseneck from normal position.

* * * * *